Figure 1:
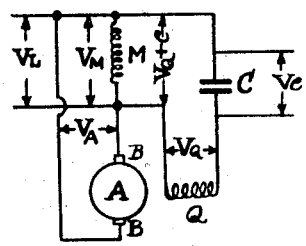

Feb. 27, 1940.  A. S. NORCROSS  2,192,051

CONSTANT SPEED MOTOR

Original Filed Aug. 30, 1937

Inventor
Austin S. Norcross
By Thomas A. Jenks
Attorney

Patented Feb. 27, 1940

2,192,051

UNITED STATES PATENT OFFICE 2,192,051

CONSTANT SPEED MOTOR

Austin S. Norcross, Waban, Mass.

Original application August 30, 1937, Serial No. 161,614. Divided and this application July 14, 1939, Serial No. 284,508

4 Claims. (Cl. 172—276)

My invention relates to a novel type of motor design for improving the commutation and power factor of alternating current commutator motors. The principles of my invention are particularly applicable to the single-phase motor described in my former Patent No. 2,060,106, operating as a constant speed motor. This application is a divisional application of my application for Alternating current commutator motor, Ser. No. 161,614, filed August 30, 1937.

In all alternating current commutator motors there is a transformer voltage induced into the coils undergoing commutation. This objectional transformer voltage is in some cases almost completely neutralized by a speed voltage at synchronous speed. However, as the speed departs from synchronism the speed voltage changes so that the neutralization becomes less effective and consequently the commutation becomes continually poorer for higher or lower speeds. This factor usually limits the speed range that may be obtained from adjustable speed motors. By utilizing the principles of my invention it is possible to have nearly complete neutralization of the transformer voltage by a speed voltage. Employing my invention, an alternating current commutator motor may be operated as a constant speed motor having good commutation at a speed differing greatly from synchronism. Thus for example, by operating a two-pole motor considerably above synchronous speed, a very high speed motor may be obtained which has shunt speed characteristics and good commutation.

In order to provide desirable characteristics, particularly good commutation, I determined after much study that a motor constructed to operate in accordance with two definite formulae, which will be set forth later, would provide these desirable characteristics. This application covers a constant speed motor to operate at a speed differing greatly from synchronism with the windings so arranged and connected so that they satisfy these two equations.

A further object of my invention is not only to design a motor in accordance with said equations which will operate with improved commutation characteristics, but also to provide in combination therewith means to provide in the rotor a power factor improving component of voltage as well as to improve the power factor thereof. In the single-phase motor shown in my former patent, it is apparent that the capacitor itself provides means to provide in the rotor a power factor improving component of voltage. I employ a similar type of capacitator in my present invention.

Further features of my invention relate to improvements in the specific structure for carrying out the principles thereof.

These and such other objects of my invention as may hereinafter appear may be best understood from a description of the accompanying drawing which illustrates an embodiment thereof.

In the drawing, Fig. 1 is a circuit diagram of a constant speed motor constructed in accordance with my invention.

Figure 2:
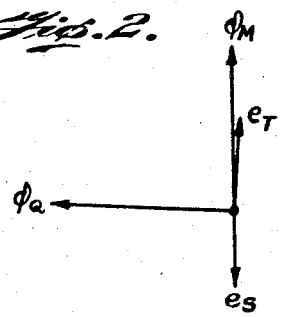

Fig. 2 is a vector diagram showing approximately the phase relations of the speed and transformer voltages induced into the coils undergoing commutation in the type of single-phase motor shown in Fig. 1.

In the drawing, wherein like characters of reference generally indicate like parts throughout, Figs. 1 and 2 illustrate an embodiment of single-phase motor constructed in accordance with the principles of my invention. The single-phase alternating current motor shown in Fig. 1 is in most respects a modification of the single-phase motor described and claimed in my former Patent No. 2,060,106. In general the embodiment of my invention shown in Fig. 1 is constructed to operate in similar fashion to the embodiment of my invention shown in said patent. If a fuller description of the theory of such a motor be desired than set forth herein, including the equations and symbols involved, reference is hereby made to said patent.

In the structure shown in Fig. 2 of said patent, I have provided adjustable means to supply voltage to the main stator winding and adjustable means to supply voltage to the quadrature winding. In the structure shown in said patent, however, the armature is permanently short-circuited. In order to improve the commutation throughout and to provide a greater speed range, I may so modify the structure shown in my former patent as to adjustably vary the voltage also supplied to the armature winding as shown in said parent application. Instead of short-circuiting the armature A, I may, as shown in said application, adjustably connect the armature to the auto-transformer T shown in Fig. 1 thereof, or to the transformer T shown in Fig. 2 thereof to receive an adjustable voltage therefrom. In the type of single-phase alternating current motors shown in Figs. 1 and 2, herein, I have employed and shown diagrammatically a motor with a main stator winding embodying a main coil M, which for convenience may be denominated the main coil or winding. A second or quadrature winding Q is located in quadrature or at ninety electrical degrees apart from said main winding. In other words, the coils M and Q are in space quadrature. For convenience, I will refer to the winding Q as the quadrature winding and to the windings M and Q together, namely, the main and quadrature, as the stator windings.

In the particular embodiment shown in Fig. 1 of said parent application, voltage is impressed from the main line 20 or source of supply onto the auto-transformer T, where in turn it is impressed upon the main winding M and the quadrature winding Q as shown in said patent. By adjusting the positions of the riders MR and QR for the main winding and the quadrature winding on the auto-transformer shown in Fig. 1 of said parent application or the single rider (M+Q)R on the transformer shown in Fig. 2 of said parent application, the voltages impressed upon the main and quadrature windings may be varied as shown in said patent. As also shown in said patent, I provide means to provide in the rotor a power factor improving component of voltage comprising the capacitator C connected in the quadrature field circuit. As stated in said patent, the capacitator C, in addition to improving the power factor, improves the torque, commutation and other desirable characteristics of the motor.

The armature A rotates within the stator and is provided with a commutator having brushes B. Instead, however, of short-circuiting the armature as shown in said patent, I adjustably impress voltage upon the armature winding from the transformer or auto-transformer T by means of adjustably moving the supplemental rider AR relative to said transformer or auto-transformer. I have found in practice that by supplementally adjustably impressing or varying the voltage impressed upon the armature winding, I am enabled to increase the speed range as in the embodiments shown in said parent application and in general improve the operating characteristics of the motor.

The speed of this motor may be adjusted by controlling $\phi_M$ and $\phi_Q$ as described in the above-mentioned patent, or by controlling the voltage $V_A$ impressed upon the brushes. The voltage $V_A$ is substantially in phase with $E_{MT}$ above synchronous speed and in phase opposition to it below synchronous speed. It will be observed by referring to Fig. 3 of the above-mentioned patent that adding a voltage $V_A$ in phase with $E_{MT}$ will result in an increase in $E_{QS}$ and a corresponding increase in speed. Similarly adding a voltage $V_A$ in phase opposition to $E_{MT}$ will decrease $E_{QS}$ and the speed. Inasmuch as $V_M$ and $V_Q$ vary in proportion to $\phi_M$ and $\phi_Q$, the speed of this motor may therefore be adjusted by controlling any one or all three of the variables $V_M$, $V_Q$ and $V_A$, and may be approximately expressed by the following algebraic equation:

$$N = \frac{-I_a Z + K\phi_M f \pm V_A}{K\phi_Q} \quad (1)$$

where Z is the impedance of the armature circuit and $I_a$ equals the armature current. This expression assumes that $E_{QS}$ is in phase opposition to $E_{MT}$ which is substantially the case as $E_{QS}$ is only slightly displaced from this position to improve the performance of the motor.

The resultant voltage induced into the coil undergoing commutation must be small to prevent brush sparking and excessive losses due to circulating currents. This resultant voltage is made up of a transformer voltage $e_t$ which is produced by the quadrature field flux and a speed voltage $e_s$ which is produced by the main field flux. In the case of the single-phase motor referred to, these two component voltages are substantially in phase opposition to each other as shown by Fig. 4 so that the best commutation is obtained when $e_t = e_s$ (2) where $e_t = K\phi_Q f$ and $e_s = K\phi_M n$.

Therefore, in adjusting the speed of the above-mentioned single-phase motor shown in said parent application, in accordance with Equation 1, it is advisable to adjust the controlling factors $\phi_M$, $\phi_Q$ and $V_A$ in such a manner as to approximately satisfy Equation 2. Furthermore, it is possible to adjust the quantities $\phi_M$, $\phi_Q$ and $V_A$ in such a way as to satisfy Equations 1 and 2 and at the same time maintain particular horsepower or torque characteristics. For instance, by adjusting $\phi_Q$ inversely proportional to the speed, the motor will be inherently a constant horsepower motor, while if $\phi_Q$ is maintained constant the motor will be inherently a constant torque motor.

In some cases it may not be practical to keep $e_t$ and $e_s$ exactly equal throughout the entire speed range. For example, as shown in Fig. 5 of said parent application, $V_M$, $V_Q$ and $V_A$ are adjusted to satisfy Equation 2 and maintain constant horse-power characteristics only above synchronous speed. To maintain the same horsepower characteristics and keep $e_s$ equal to $e_t$ below synchronous speed, excessive main and quadrature field fluxes would be required if the field fluxes were normal at synchronous speed. Under this condition it might be advisable to obtain the speeds below synchronism by keeping $V_M$ and $V_Q$ constant and adjusting $V_A$ as indicated in Fig. 5 of said parent application. While $e_s$ is not exactly equal to $e_t$ when this is done, the resultant voltage induced into the coil undergoing commutation is small for speeds from synchronous to one-half synchronous speed. Constant torque characteristics will then be obtained below synchronous speed.

There are other cases where it may not be practical to maintain $e_s$ exactly equal to $e_t$ throughout the speed range. For example, if $V_M$ is kept equal to $V_Q$ as indicated in Fig. 6 of said parent application the auto-transformer is obviously simplified and the small difference between $e_s$ and $e_t$ in this case will not produce appreciable brush sparking throughout a large speed range.

The two component voltages $e_t$ and $e_s$ will be exactly in phase opposition when the two fields $\phi_M$ and $\phi_Q$ are in exact time quadrature. In this case the two oscillating fields are in both space and time quadrature and when they are equal a circular revolving field results which is identical with that obtained from a polyphase machine. It therefore should be evident that commutation in a polyphase motor is equivalent to that of a single-phase motor when the main and quadrature fields are equal and in time quadrature.

The conditions of Fig. 6 of said parent application therefore are applicable to a polyphase motor where the voltages indicated are phase-voltages as shown in Fig. 13 of said parent application. By means of a circuit arrangement, such as indicated in Fig. 11 of said parent application, the speed of a three-phase commutator motor may be adjusted by controlling the voltages impressed upon the stator and armature brushes in such a manner as to keep the difference between $e_s$ and $e_t$ small and thus maintain very good commutation over a large speed range.

Figs. 5 and 6 of said parent application represent graphs of suitable ways to satisfy the Equations 1 and 2 in the manner hitherto explained. To obtain these curves from Equation 1 the term $I_aZ$ drop will obviously not be the same for different motors and those skilled in the art can modify these curves to take into consideration the voltage drop for any particular motor. As will be apparent from an inspection of Figs. 1 and 5 of said parent application, there are three variables, namely, $V_M$, $V_Q$ and $V_A$. I have shown in Fig. 1 of said parent application riders MR, QR and AR to adjustably contact the autotransformer T to provide independent variation of each of these three variables. It is apparent that if a voltage regulator be provided which will supply voltages to each of the stator windings, including the main winding and quadrature winding and the armature winding, separately and independently, in such predetermined combinations varying for different speeds in accordance with these curves or other curves to satisfy the respective equations at different speeds, the speed and transformer voltages induced into the coils undergoing commutation will be substantially equal at all speeds.

It is also apparent that instead of providing adjustable riders as shown in said parent application to vary the voltages impressed upon the armature, main and quadrature windings, either jointly or independently, said respective windings may be arranged and connected to the supply in such a predetermined combination as to cause the speed and transformer voltages induced into the coils undergoing commutation to be substantially equal at any speed above or below synchronism. This may be done by permanently fitting the adjustable riders against the desired points in the desired predetermined combination of a transformer or auto-transformer, in accordance with the curves shown in Figs. 5 or 6 of said parent application, or otherwise in accordance with said equations, or it may be done by varying the general design of the motor to cause it to operate in accordance with said equations. I have shown in Fig. 1 of this application a constant speed motor constructed in accordance with my invention, with the desired number of turns in the respective main, quadrature, and armature windings to satisfy said equations.

It is preferable in designing this motor to design the quadrature winding and the capacitator so that when they are directly connected to the supply they will provide the desired quadrature field flux, $\phi_Q$. The main winding and armature windings may then be designed to produce a main field flux which will satisfy the Equations 1 and 2 when the main winding and the armature windings are connected directly to the supply.

It should be obvious that these principles are applicable in many other forms for adjustable speed motors and are also useful for constant speed motors. For example, a very high constant speed motor may be obtained by operating a two-pole motor at a speed considerably greater than synchronism. In such a case the transformer may be entirely eliminated as in Fig. 1. This motor is particularly suitable for high speeds greater than 3600 R. P. M.

It is thus apparent that I have provided a control for an alternating current motor, which may be operated as a constant speed motor to operate in accordance with the principles of my invention and which may, if desired, be provided in combination therewith with means to provide in the rotor a power factor improving component of voltage and having the advantages explained above.

For convenience, I append a list of the symbols used in this specification in referring to the various electric forces considered.

$\phi_M$=Main field flux.
$\phi_Q$=Quadrature field flux.
$V_A$=Voltage impressed on brushes.
$E_{MT}$=Transformer voltage induced into armature from main field flux.
$E_{QS}$=Speed voltage generated in armature from quadrature field flux.
$V_M$=Main field voltage.
$V_Q$=Quadrature field voltage.
$N$=Speed.
$I_a$=Armature current.
$Z$=Impedance of armature circuit.
$f$=Frequency.
$e_t$=Transformer voltage induced into coil undergoing commutation.
$e_s$=Speed voltage generated in coil undergoing commutation.
$n$=Speed multiplied by number of pairs of poles.
$K$=Constant.

It is understood that my invention is not limited to the specific embodiment illustrated herein and that various deviations may be made therefrom without departing from the spirit and scope of the appended claims.

What I claim is:

1. In combination an alternating current motor comprising a main winding, a rotor having a coiled commutator armature winding, brushes placed substantially along the axis of said main winding, a quadrature winding spaced ninety electrical degrees from the main winding, and dephasing means in the circuit of the said quadrature winding comprising a capacitator of such magnitude as to dephase the circuit of the quadrature winding relative to the main winding by an amount to produce an angle having a cosine between .5 and 1 between the armature current and the quadrature field flux, said windings being arranged and connected to the supply in such a predetermined combination in accordance with predetermined voltage and speed characteristics as to cause the speed and transformer voltages induced into the coils undergoing commutation to be substantially equal.

2. In combination, an alternating current motor comprising a main winding, a rotor having a coiled commutator armature winding, brushes placed substantially along the axis of said main winding, a quadrature winding spaced ninety electrical degrees from the main winding, and means for dephasing the current in said quadrature winding to produce an angle having a cosine between .5 and 1 between the armature current and the quadrature field flux, said windings being arranged and connected to the supply in such a predetermined combination in accordance with predetermined voltage and speed characteristics as to cause the speed and transformer voltages induced into the coils undergoing commutation to be substantially equal.

3. In combination, an alternating current motor comprising a main winding, a rotor having a coiled commutator armature winding, brushes placed substantially along the axis of said main winding, a quadrature winding spaced ninety electrical degrees from the main winding, and dephasing means in the circuit of the said quadrature winding comprising a capacitor of such magnitude as to dephase the circuit of the quadrature winding relative to the main winding by an amount to produce an angle having a cosine between .5 and 1 between the armature current and the quadrature field flux, said windings being arranged and connected to the supply to provide voltages and fluxes substantially in accordance with the equations $e_t = e_s$ and $$N = \frac{-I_a Z + K\phi_M f \pm V_A}{K\phi_Q}$$

4. In combination, an alternating current motor comprising a main winding, a rotor having a coiled commutator armature winding, brushes placed substantially along the axis of main winding, a quadrature winding spaced ninety electrical degrees from the main winding, and means for dephasing the current in said quadrature winding to produce an angle having a cosine between .5 and 1 between the armature current and the quadrature field flux, said windings being arranged and connected to the supply to provide voltages and fluxes substantially in accordance with the equations $e_t = e_s$ and $$N = \frac{-I_a Z + K\phi_M f \pm V_A}{K\phi_Q}$$

AUSTIN S. NORCROSS.